Nov. 17, 1964 J. R. PALMA 3,157,210
APPARATUS FOR FILLING NURSING BOTTLES
Filed Nov. 3, 1960 2 Sheets-Sheet 1

INVENTOR.
James R. Palma
BY
Attorney

Nov. 17, 1964  J. R. PALMA  3,157,210
APPARATUS FOR FILLING NURSING BOTTLES
Filed Nov. 3, 1960  2 Sheets-Sheet 2

INVENTOR.
James R. Palma
BY
Attorney

United States Patent Office 3,157,210
Patented Nov. 17, 1964

3,157,210
APPARATUS FOR FILLING NURSING BOTTLES
James R. Palma, Miami, Fla.
(7 Arden Craig Drive, Albany 3, N.Y.)
Filed Nov. 3, 1960, Ser. No. 66,952
5 Claims. (Cl. 141—82)

This invention relates to an apparatus for filling nursing bottles used for feeding infants, and more particularly to an apparatus of this kind that is desirable where a large number of infants are to be fed, such as in hospitals, nurseries, and other institutions.

It is an object of the invention to provide an apparatus of this kind in which liquid food, such as a formula, can be kept and maintained at the required temperature for preservation; which can be heated in regulated quantities to the required temperature for feeding, and with which the bottles or other feeding containers can be readily and sanitarily filled for dispensation of their food contents to the infants.

It is another object of the invention to provide an apparatus of this kind by which sterilization of bottles, nipples and other parts of the feeding containers can be properly sterilized, and by which drainage and sterilization of parts of a food-heating chamber, ducts leading therefrom and including a food-dispensing tube, can be performed.

It is another object of the invention to provide, within a single housing or casing, a tank within which the liquid food is retained at a preservation temperature; to provide a chamber in which a quantity of the food can be heated, and to provide a dispensing tube by which the heated food can be dispensed into bottles for presentation to the infants. The invention further contemplates the provision, within the housing or casing, of a sterilizing tank into which bottles, nipples and other elements may be placed and from which sterilizing fluid may be drawn to sterilize the fluid chamber and ducts leading therefrom.

It is a further object of the invention to provide an improved nursing bottle for use in connection with the apparatus herein described and which bottle is provided with a bottom inlet opening to which one end of a food-dispensing tube is adapted to be coupled, and to provide a weighted closure plug for said opening, which plug renders the bottle bottom heavy and tends to maintain it upright when placed on a flat surface.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a front elevational view of a nursery bottle filling apparatus, constructed according to the invention;

Figure 1:
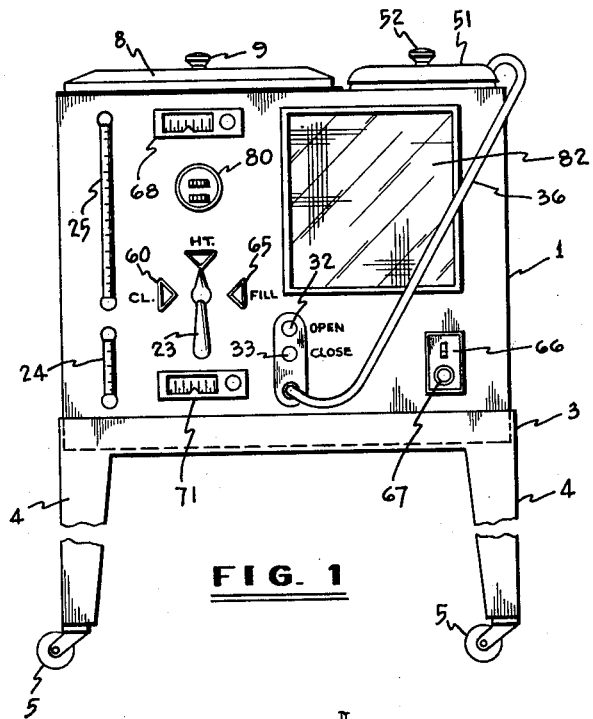
Figure 2:
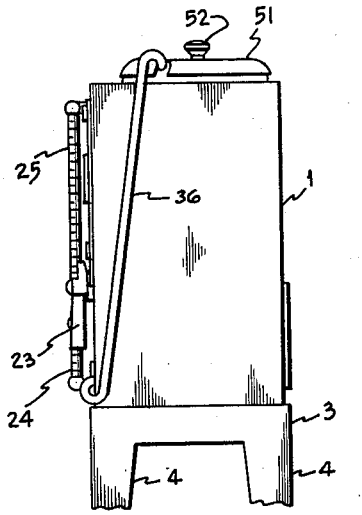
FIG. 2 is a side elevational view of the same as viewed from the right of FIG. 1.

The apparatus herein shown is especially suitable for portable use, enabling it to be readily moved to and located at the point where the infants are fed, so that the bottles when filled can be promptly put to use in feeding the babies.

Referring to the drawings, 1 indicates the outer casing or housing of the apparatus. The same is supported on a frame 3 having legs 4, provided with casters 5, on which the apparatus may be moved about from place to place as required.

Supported within the casing 1, is a tank 7 adapted to contain a supply of the liquid food or so-called "formula" for the feeding of babies. The top of the tank 7 is normally closed by a removable cover or lid 8, provided with a knob 9, by which it may be manually placed on top of the tank 7 or lifted therefrom.

Surrounding the tank 7 is a spirally-grooved plate 6 providing a refrigerant passage 10 through which a fluid cooling medium is caused to flow in order to maintain the food contents of the tank 7 at the required temperature for preservation. The refrigerant is passed through the passage 10 by means of a refrigerating unit 11 mounted in supporting brackets 12 secured to a base 13 on the bottom of the casing 1. The inlet and return piping shown at 14 and 15 connects the refrigerating unit to the passage 10. A thermostat 16 extends into the tank 7 and the same is effective to control the temperature of the liquid food contained in the tank. A stirrer or agitating paddle 45 is operative in the lower part of the tank 7, said paddle being rotated by means of an electric motor shown at 46.

The tank 7 is provided at the bottom with an outlet nipple 17 connected to a valve housing 18 containing a solenoid valve 19, the movement thereof to one position being controlled by a switch 65. The valve housing 18 has an outlet 20 connected to a food-heating chamber 21 adapted to receive and heat a predetermined quantity of the liquid food removed from the tank 7 for subsequent delivery into the nursing bottles 22. The chamber 21 is preferably of considerably less capacity than the tank 7. When the switch 65 for the valve 19 is turned to one of its positions or that marked "Fill" in FIG. 1, by turning the handle 23 to the right, communication will be established between the tank 7 and the chamber 21 and some of the fluid contained in the tank 7 will flow by gravity into the chamber 21 to fill the chamber to a desired extent. A gauge glass shown at 24 in FIG. 1, serves to indicate the level of the food in the chamber 21 and by observation of the level indicated by the gauge glass, the chamber 21 can be filled to the extent desired for one or more bottle feedings. A similar gauge glass shown at 25 is employed for the tank 7, thereby enabling the level of the food therein to be always determined by a glance at the gauge glass.

When the chamber 21 is filled to the required extent with food flowing from the tank 7, the chamber 21 and its contents are heated by means of an electric heater 26 of known type. A thermostat 27 contained in the chamber 21, controls the heat of the food therein. An air vent tube 28 has its lower end connected into the valve housing 18 and its upper end entering into the tank 7 near the top thereof.

Figure 3:
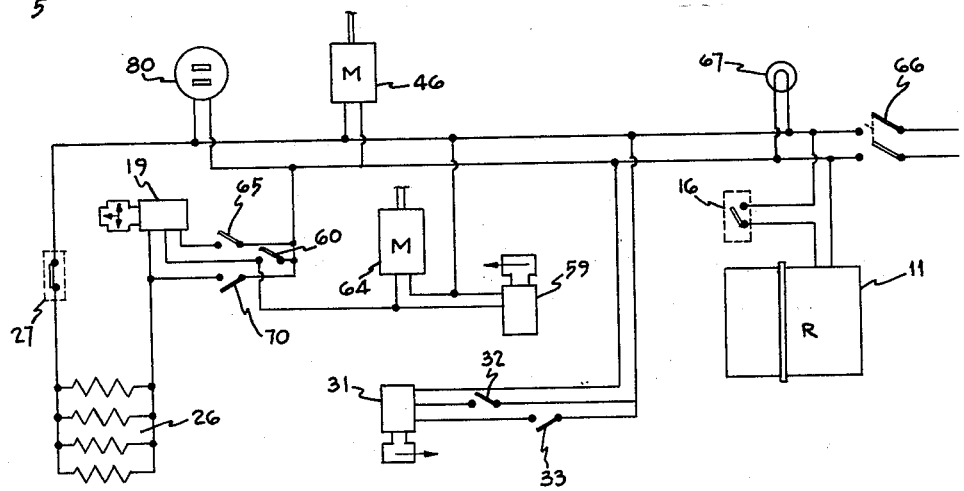
FIG. 3 shows the electrical diagram for the apparatus.

The chamber 21 is provided with an outlet 29 at its bottom, and said outlet is connected to a valve housing 30 containing a solenoid valve 31 controlled by the push-button switches 32 and 33 shown in FIG. 3. The switch 32 is operative to cause opening of the valve 31 to the position shown in FIG. 4. The valve housing 30 is provided with an outlet 34 connected to an elbow 35 to which the end of a flexible food-dispensing tube is attached.

Figure 4:
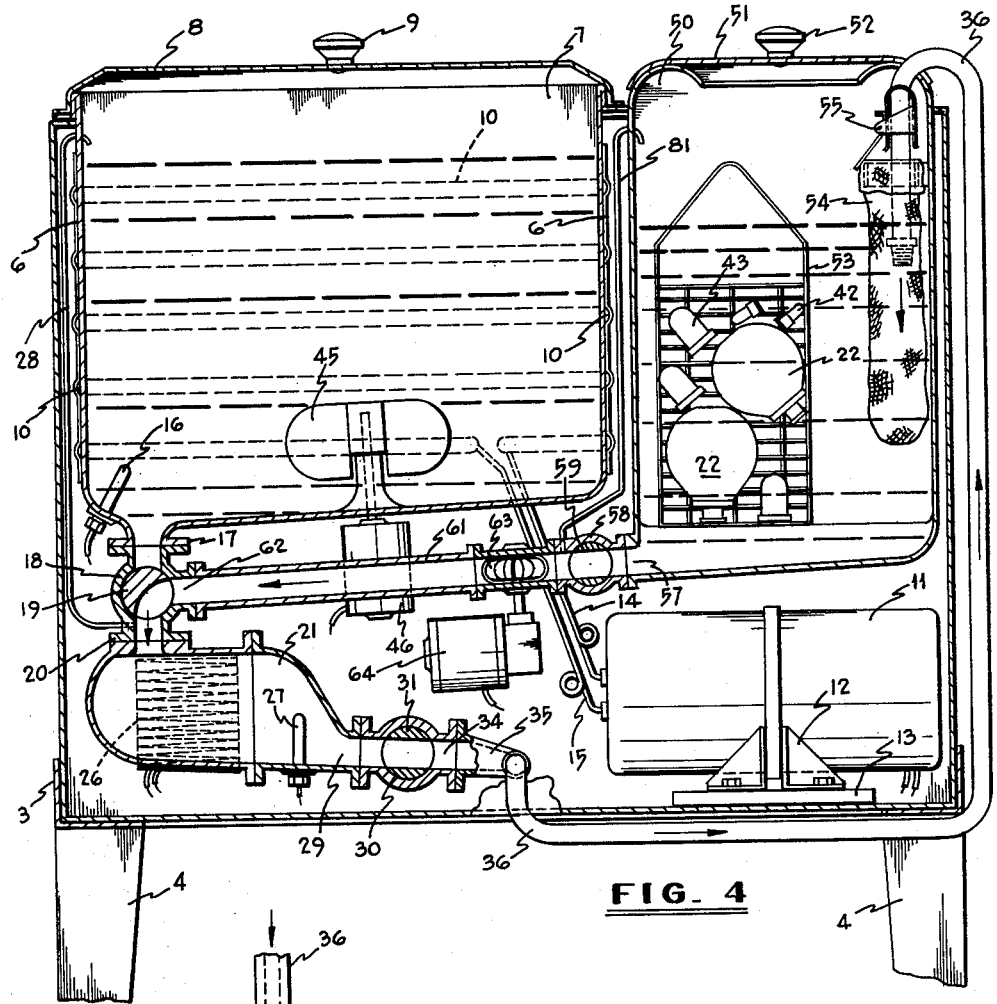
FIG. 4 is a vertical sectional view through the apparatus.
Figure 5:
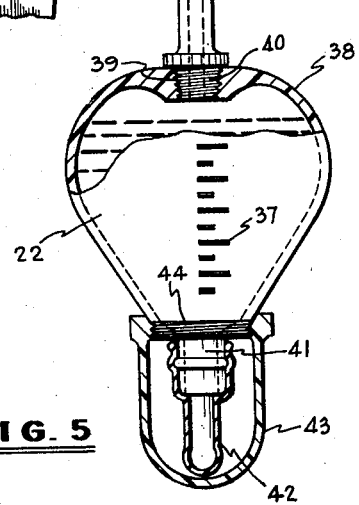
FIG. 5 is a view, with parts in section, of one of the bottles and parts associated therewith.
Figure 6:
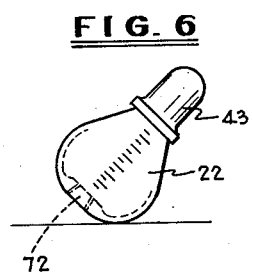
FIG. 6 shows how one of the bottles will right itself, or come into an erect position, when placed on a flat surface.

When the valve 31 is in the open position shown in FIG. 4, the contents of the chamber 21 will flow by gravity into the feed tube 36 for delivery into one of the bottles shown at 22 to fill the bottle to the required extent as determined by the graduations 37 provided on the outside of the bottle. The bottle 22 is preferably, although not necessarily, composed of transparent plastic material and can be of the pear shape shown in the drawings. The shape of the bottle is such as to provide a rounded base portion or bottom 38 having a central threaded opening 39 adapted to receive a threaded nipple 40 provided at the free end of the food-dispensing tube 36. Thus, when the tube 36 has its nipple 40 threadably connected to the bottle 22 as shown in FIG. 5, the liquid food will flow from the tube 36 into the bottle and fill the bottle to the required level. The bottle 22 is provided with a neck 41 on which the conventional feeding nipple is fitted. A protective dome-shaped cap 43 can be fitted over the nipple 42 by its threadable engagement with the threads 44 provided on the bottle.

Contained within the casing 1 and disposed alongside of the tank 7 is a sterilizing tank 50 containing a sterilizing fluid. The tank 50 is adapted to be closed at the top by a cover 51, provided with a knob 52, by which it can be placed on or removed from the tank. The tank 50 contains a removable basket or cage 53 in which a number of the bottles 22, the nipples 42 and the protective caps 43 may be placed for sterilization purposes. Also supported within the tank 50, with its open end or mouth disposed upwardly, is a filter bag 54 into which the end of the tube 36 is adapted to be inserted after the tube has completed the operation of filling one or more of the bottles 22. A valve 55 of the pivoted lever type and which forms a clamp on the tube 36 is fitted on the tube 36 so that the flow of food through the tube can be shut off when a bottle is filled and before the end of the tube is inserted into the filter bag in the position shown in FIG. 4.

At its lower end, the sterilizing tank 50 is provided with an outlet 57 which connects to a valve housing 58 containing a solenoid valve 59. Said solenoid valve 59 is controlled by the switch indicated at 60. The outlet end of the valve housing 58 is connected to one end of a pipe or conduit 61 that has its opposite end connected to an outlet 62 on the valve housing 18. Operative in the pipe 61 at a point between the two valves 19 and 59 is a pump 63 operated by an electric motor 64. An air vent pipe 81 has its lower end connected into the valve housing 58 and its opposite end entering the sterilizing tank 50 near the upper end of the same.

The operation of the improved bottle-filling apparatus is substantially as follows:

The tank 7 for the liquid food is filled to the required level through the open top as determined by examination of the gauge glass 25. The main switch 66 controlling the flow of electrical current to the apparatus is closed and the closure of the switch will illuminate the pilot light indicated at 67. The agitator 46 will begin operation to mix or stir the contents of the tank 7 and the refrigerating unit 11 will cool the food in the tank 7 to the required temperature controlled by the thermostat 16. The setting device for the thermostat 16 is indicated at 68 and it includes a calibrated dial for precise setting. While the tank 7 is being filled with the food, the valve 19 remains closed as shown in FIG. 4. At this time, the valves 31 and 59 are also closed. When it is desired to deposit a quantity of the food into the chamber 21, the valve 19 is moved to a position where it establishes communication between the interior of the tank 7 and the interior of the chamber 21, allowing the food to flow by gravity from the tank 7 into the interior of the chamber 21 to the extent desired and in quantity sufficient to enable one or more of the bottles 22 to be filled. By the operation of a switch shown at 70 the heater 26 will be caused to function to heat the contents of the chamber 21 to the desired temperature, the temperature being regulated by the thermostat 27 and set by the dial 71 seen in FIG. 1.

Figure 7:
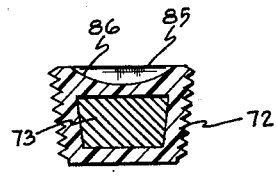
FIG. 7 is a sectional view through the weighted closure plug that fits into an opening in the bottom of the bottle.

When it is desired to fill one of the bottles 22, the threaded nipple 40 on the end of the tube 36 is attached to the bottle as shown in FIG. 5 and the bottle is held with its nipple-end down until the required amount o food flows into the bottle as determined by the gradu-ations 37 on the bottle. When the bottle is filled, the clamp valve 55 on the tube 36 is closed and the tube is then detached from the bottle. A closure plug shown at 72 in FIG. 7 is threadably inserted in the bottle opening 40 to close the opening and the filled bottle may then be used to feed an infant. It will be noted that the plug 72 is provided with an enclosed weight 73 so that when the plug is inserted into the opening 40 of the bottle, it will bottom-weight the bottle so that when the bottle is placed on any flat surface it will at once upright itself, thus keeping its nipple 42 or the nipple-enclosing cap 43 free from contact with such surface. To facilitate the threading and unthreading of the plug 72, the same is provided with a finger-piece 85 in the form of a cross-rib disposed in a recess 86 in the top of the plug.

When it is desirous of sterilizing the chamber 21 and the interior of the tube 36 connected thereto, the food contents of the chamber 21 as well as any food in the tube are drained out through the tube 36. With valve 19 remaining in the position shown in FIG. 4 and with communication between the interior of the tank 7 and the chamber 21 shut off, the valves 31 and 59 are opened and the pump 63 is set in operation by manipulation of the switch 60. The sterilizing fluid contained in the tank 50 will be caused to flow from the sterilizing tank through the pipe or conduit 61, through the chamber 21 and through the end 40 of the tube 36, which is at the time directed into the filter bag 54 within the tank 50 as clearly shown in FIG. 4. When cessation of the sterilizing operation is desired, the valve 59 is closed and the sterilizing fluid then remaining in the pipe 61, in the chamber 21 and in the tube 36 will be forced out through the tube 36 and returned to the tank 50 out of the end of the tube 36 then dependent into the tank 50 as shown in FIG. 4. As the pump 63 continues its operation the interior of the chamber 21 and the tube 36 will become dried. The valve 31 is then closed and operation of the pump 63 is discontinued and the apparatus is then in readiness for the next refilling of the chamber 21 by moving the valve 19 to the position where it establishes communication between the interior of the tank 7 and the interior of the chamber 21. For convenience in the use of the apparatus, an outlet 80 may be provided for the connection of an electrically-operated clock.

The apparatus is readily portable and it can be easily moved to any location most convenient for its use. The food constituting the formula is kept free from the possibility of contamination. The bottles and nipples placed in the sterilizing tank are maintained at hand and are kept clean and sanitary. The filling of the bottles is a clean, quick operation and the delay and inconvenience of transporting the bottles from a filling station to the point of use is avoided. A window 82 provided in the front of the housing or casing 1 permits inspection of the contents of the sterilizing tank.

Having described a single embodiment of the invention, it is obvious that the same is not to be restricted thereto, but is broad enough to cover all structures coming within the scope of the annexed claims.

What I claim is:

1. An apparatus for filling nursing bottles comprising, a tank for containing a liquid food, refrigerating means for the tank, a food chamber into which food is fed from the tank, heating means for the chamber, a food-dispensing flexible tube connected to the chamber and provided with means at one end by which it can be connected to an inlet opening in a nursing bottle whereby food may be fed from the chamber into said bottle, a sterilizing tank, a conduit connecting the sterilizing tank with the food chamber, a valve in said conduit, a valve disposed between the outlet of the food tank and the chamber, said last-mentioned valve being effective to connect the food tank to the chamber or to connect the sterilizing tank to the chamber, a valve disposed between the outlet of the food chamber and the dispensing tube, and a pump operative in the conduit between the sterilizing tank and the food chamber.

2. An apparatus for filling nursing bottles comprising, a tank containing liquid food, said tank having an outlet at its bottom, a food chamber of smaller capacity than the tank having an inlet connected to the outlet of the tank, a valve interposed between the outlet of the tank and the inlet of the chamber, a sterilizing tank containing a sterilizing fluid, said sterilizing tank having a bottom outlet connected at a point between the inlet of the chamber and the outlet of the food-containing tank, the flow of food from the food-supply tank and the flow of sterilizing fluid to the food chamber being selectively controlled by said valve, the chamber having an outlet, a dispensing tube connected to said outlet, and a valve interposed between the dispensing tube and the outlet of the chamber.

3. An apparatus for filling nursing bottles as provided for in claim 2, including refrigerating means for the food-containing tank, thermostatically-controlled heating means for the chamber, a valve located between the outlet of the sterilizing tank and the inlet to the chamber, a pump operative between the latter valve and the inlet of the chamber, and means at the end of the dispensing tube for coupling it to a nursing bottle.

4. An apparatus for filling nursing bottles comprising, a casing, a tank containing a liquid food within the casing, means for refrigerating the tank, said tank having an outlet at its bottom, a food chamber of smaller capacity than the tank having an inlet at its top connected to the outlet of the tank, means for heating the food chamber, a valve interposed between the outlet of the tank and the inlet of the food chamber, a sterilizing tank contained in the casing alongside of the food-containing tank, said sterilizing tank containing a fluid sterilizing medium, the sterilizing tank having a bottom outlet, a conduit having one end connected to said bottom outlet and its other end connected at a point between the inlet of the chamber and the outlet of the food-containing tank, the flow of food from the food-containing tank into the food chamber and the flow of sterilizing fluid from the sterilizing tank to the food chamber being selectively controlled by said valve, the chamber having an outlet, a dispensing tube connected to the said outlet, a valve interposed between the dispensing tube and the outlet of said chamber, a pump operative in the conduit between the outlet of the sterilizing tank and the chamber and a valve between the pump and the outlet of the sterilizing tank.

5. An apparatus for filling nursing bottles comprising a pair of tanks, one of said tanks being refrigerated and containing a liquid food, the other tank containing a sterilizing fluid, a heated food chamber to which food from the food-containing tank is fed, valve means for controlling the flow of food from the food-containing tank to the chamber, the sterilizing tank having a conduit extending between it and the chamber, valve means effective in said conduit to establish communication between the sterilizing tank and the chamber while communication between the food-containing tank and the chamber is cut off by the first-mentioned valve means, a dispensing tube connected to the chamber, a valve located between the chamber and the dispensing tube for controlling the flow of food out of the chamber and through the tube, and pump means operative in the conduit to force sterilizing fluid from the sterilizing tank through the chamber and out of the dispensing tube while communication is cut off between the food-containing tank and the chamber.

References Cited in the file of this patent

UNITED STATES PATENTS

| Number | Name | Date |
|---|---|---|
| 145,999 | Hallock | Dec. 30, 1873 |
| 504,527 | Hemp | Sept. 5, 1893 |
| 601,735 | Saw | Apr. 5, 1898 |
| 932,150 | Louis | Aug. 24, 1909 |
| 1,481,359 | Dye | Jan. 22, 1924 |
| 1,586,745 | Hulse | June 1, 1926 |
| 1,628,853 | Lomax | May 17, 1927 |
| 1,960,936 | Brody | May 29, 1934 |
| 1,987,649 | Wertz | Jan. 15, 1935 |
| 2,029,460 | Brady | Feb. 4, 1936 |
| 2,042,928 | Da Costa | June 2, 1936 |
| 2,118,704 | Grontkowski | May 24, 1938 |
| 2,124,798 | Schuler | July 26, 1938 |
| 2,461,766 | Peeps | Feb. 15, 1949 |
| 2,462,617 | Eckels | Feb. 22, 1949 |
| 2,480,931 | Jaeger | Sept. 6, 1949 |
| 2,494,518 | Oakes | Jan. 10, 1950 |
| 2,548,481 | McDonald | Apr. 1, 1951 |
| 2,673,379 | Jewell et al. | Mar. 30, 1954 |
| 2,699,885 | McClure | Jan. 18, 1955 |
| 2,720,879 | Gasca et al. | Oct. 18, 1955 |
| 2,767,960 | Fast | Oct. 23, 1956 |
| 2,787,875 | Johnson | Apr. 9, 1957 |
| 2,912,142 | Schultz | Nov. 10, 1959 |